Nov. 16, 1926.
C. C. RICH
STORAGE BATTERY PLATE
Filed June 20, 1923
1,607,304
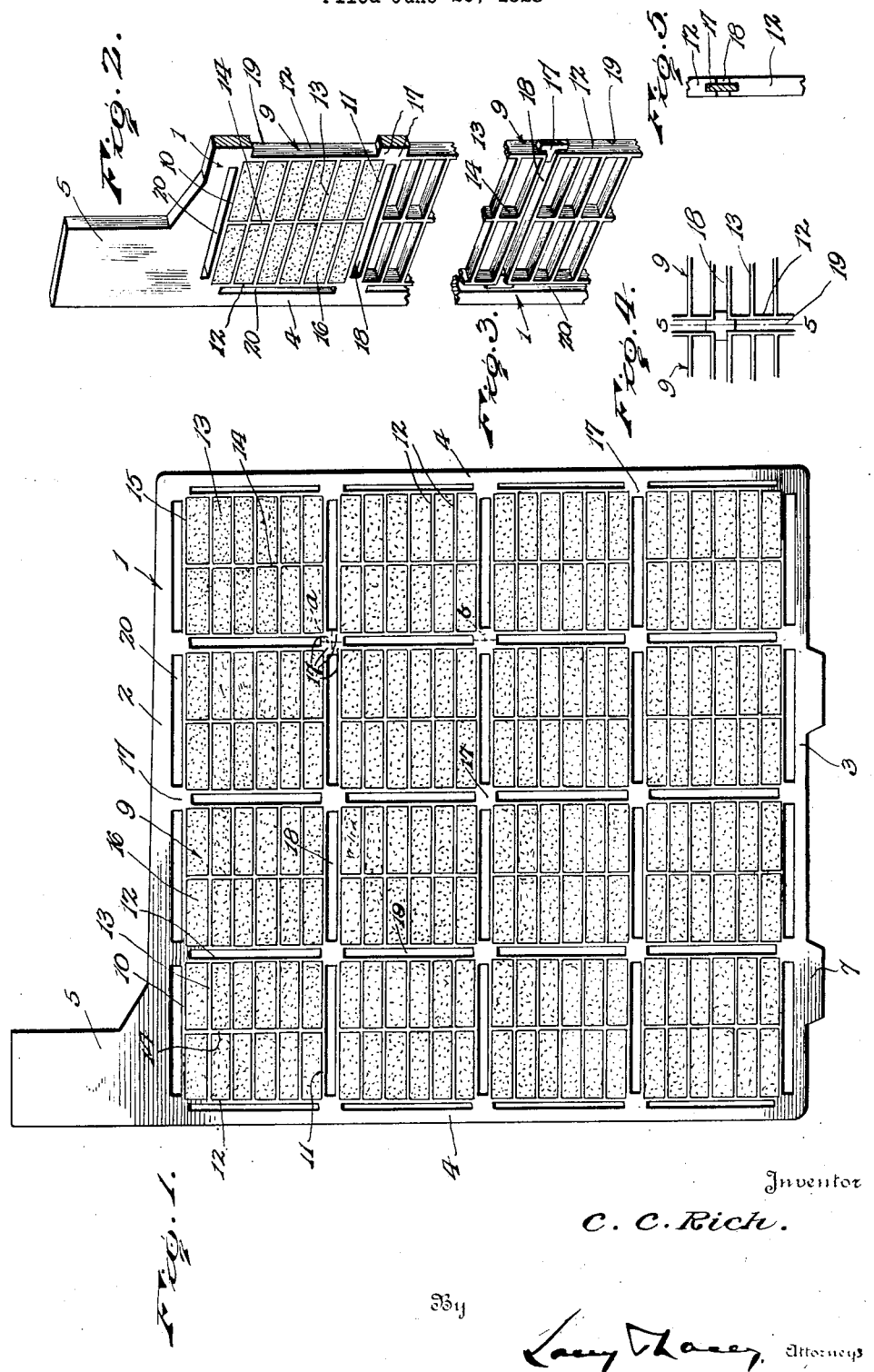
Inventor
C. C. Rich.
By
Lacey & Lacey, Attorneys Patented Nov. 16, 1926.

1,607,304

UNITED STATES PATENT OFFICE.

CHARLES CLAYTON RICH, OF MOUNT VERNON, NEW YORK, ASSIGNOR OF ONE-TWENTIETH TO CHARLES WINTERMEYER, OF MOUNT VERNON, NEW YORK.

STORAGE-BATTERY PLATE.

Application filed June 20, 1923. Serial No. 646,609.

This invention relates to improvements in storage battery plates.

The battery plate embodying the invention is of the lead-acid type as are most storage battery plates, and ordinarily plates of this type comprise a frame within the boundary of which are supported partitions which serve to divide the interior of the frame into a number of cells in all of which a filling of electro-active material is pressed. Under conditions of use, the active material contracts while the battery is undergoing charge, and it expands while the battery is being discharged which contraction and expansion is unavoidable. The expansion of the active material during discharge, to a certain point, is expected and is known as the normal expansion. However, when the battery is discharged beyond this point, the expansion of the electro-active material takes place to an even greater degree and is known as abnormal expansion, and this abnormal expansion is productive of very damaging results, one of the most serious of which is the tendency of the plates to buckle or dish due to the stresses which are imposed upon the frame of the plate. This buckling or dishing of the plates is due partly to the fact that their marginal frames are relatively rigid and cannot therefore yield to compensate for the expansion and contraction of the filling of active material, and further to the fact that it is customary to completely fill all of the cells of the plate or the grid elements comprising the body of the plate with the electro-active material so that pressure set up at the time of its expansion, will be cumulative and act in the direction of least resistance. In another type of plate, there is provided, within the marginal frame, intersecting vertical and horizontal partition members forming, in effect, a frame having a number of rectangular openings each divided by partitions into cells into all of which the electro-active material is pressed. In another structure a rectangular marginal frame is divided by vertical and horizontal partition members into a number of rectangular openings, and a grid element is supported within each of these openings and supports the electro-active material, each grid element having an individual marginal frame which is secured to the first mentioned marginal frame and its cross members at one or more points thus leaving expansion spaces of greater or less extent between the partition members of the main frame and the marginal frame of the said grid elements. In all of these structures, however, the arrangement of the component parts of the plate is such that upon abnormal expansion of the electro-active material, the plate will be liable to buckle. In view of the foregoing it is the primary object of the present invention to provide a construction of battery plate in which ample provision is made for relieving the frame of the plate of the excessive strains and stresses which would otherwise be imposed thereon in the expansion of the electro-active material and thereby prevent the dishing or buckling of the plates and the fracture of the frame of the plate as occurs in plates as ordinarily formed.

In the manufacture of storage battery plates, and particularly in the step of pressing into the frame the electro-active material it has been found to be practically impossible to so perform this step that the material will be of the same density throughout the area of the plate. Because of this variation in density in different portions of the area, and for other reasons, when expansion takes place under conditions of discharge, the expansive or thrust force created is not of equal degree throughout all portions of the area of the plate. It is partly for this reason that the strains which are consequently imposed upon the margins of the frame of the plate cause buckling of the plate, the strains and stresses being unequally distributed. With these facts in view, the present invention therefore contemplates the provision of a battery plate so constructed as to equalize, to a maximum degree, the distribution of the strains and stresses incident to expansion of the electro-active material of the plate, the construction being such in fact that the thrust forces which would ordinarily be imposed upon the members of the frame of the plate are to a great extent relieved or neutralized and distributed before they can be so imposed, the result being that a plate constructed in accordance with the present invention will not become distorted under discharging conditions but will retain its shape, even when discharge is repeatedly carried to a very low point.

Under conditions of discharge, the active material of the storage battery plate reacts with the acid in the electrolyte and consequently the portion of the solution which is in immediate contact with the plate surface immediately commences to become depleted of its acid content, its electrical conductivity is lessened, and the internal electrical resistance of the cell of which it constitutes a part, is increased. It is evident, therefore, that an ideal condition would be one in which a reservoir of electrolyte would completely surround the plate. This has heretofore been found impractical, however, in storage battery cells of ordinary construction as employed for automobile starting and lighting, electric vehicle propulsion, railway car lighting systems, and similar purposes, inasmuch as the wood or other separators usually employed between the plates have their sides which face the negative plate, plain and smooth thus practically inhibiting circulation of the electrolyte except through permeation of the porous separator by the electrolyte. A more favorable condition obtains as regards the face of the separator which is presented toward the positive plate, as this face is vertically grooved to provide channels for the circulation of the electrolyte and the escape of gases. It has been demonstrated by actual tests that in the ordinary storage battery cell, under discharge conditions, the impoverishment of the electrolyte is greater as the distance from the outer edges of the separator increases, as a consequence of sluggish circulation of the electrolyte and slow diffusion of the acid content thereof in proximity to the faces of the plates. In view of the foregoing it is another important object of the invention to provide for freer circulation of the electrolyte so that from sources of storage supply, portions of the volume of the electrolyte solution relatively strong in acid content, may circulate to mix with and displace the portions of the volume which have been depleted of their acid content, thereby maintaining, throughout the entire volume of the electrolyte solution, a more nearly uniform ratio of acid content. In this manner the internal electrical resistance of the battery cell is kept at minimum, the chemical reaction which takes place over the area of the plate is more uniform, and, in general, a higher sustained cell voltage is obtained under conditions of discharge.

It has been pointed out above that in some of the ordinary forms of battery plates, the active material is supported within a frame which includes vertical and horizontal cross members. Without exception, so far as I am aware, in all such constructions the frames and the cross members are of considerable cross sectional dimensions and that practically all spaces within the boundary of the frame are filled with the electro-active material. Another highly important object of the present invention is to provide a different construction and arrangement of elements from that referred to above whereby new and better results may be obtained. With this end in view the present invention contemplates forming the frame or foundation of each electro-active element of the plate of relatively small cross sectional dimensions, and bonding the said grid elements to one another and to the main frame at their corners only, and to so form the bonds, that a substantially free circulation of the electrolyte may take place within the cells and about the plates, the spaces between adjacent sides or ends of the grid elements, and the grid elements and the marginal frame of the plate, constituting channels to provide for such circulation and for temporary storage of such portions of the volume of the electrolyte as are not in actual contact with the faces of the plates, the replenishment of the acid content of the partially depleted portions of the volume of the electrolyte being in this manner effected. Likewise by connecting the grid elements at their corners, they are reinforced and strengthened at the point where they are most likely to rupture in the event of abnormal expansion of the electro-active material.

Another object of the invention is to so construct the battery plate that it will be unusually well adaped to withstand the disintegrating effects of mechanical vibrations. Where a rigid battery plate is employed and is subjected to mechanical shock or vibration, the force of the shock will be transmitted across the plate in a wave-like manner, and the transmission of the force of the shock is in proportion, in extent and degree, to the solidity of the plate as a whole. Therefore, the present invention contemplates providing a battery plate so constructed that it will possess a degree of flexibility enabling it to absorb, to a great extent, any shocks to which it may be subjected. It will be found that of several plates of ordinary construction and of different dimensions, subjected to shocks or vibrations under identical conditions, the plate of smallest dimensions will show little or no effects from the shock forces to which it has been subjected whereas the largest plate will plainly show disintegration. Therefore, the present invention contemplates the provision of a battery plate comprising a main frame in which a number of grid sections are arranged and bonded, each individual section constituting in effect a small battery plate, and the connection between the adjacent sections and the sections and the frame being such as to overcome the defects referred to above.

In the accompanying drawings:

Figure 1 is a view in side elevation of a battery plate constructed in accordance with the invention;

Fig. 2 is a fragmentary sectional perspective view of a portion of one of the plates, the filling of electro-active material being omitted from a part of one of the grid sections of the plate to better illustrate the general structure of the plate or foundation;

Fig. 3 is a view similar to Figure 4 illustrating a modification of the invention;

Fig. 4 is a view in elevation of the modified structure shown in Figure 3;

Fig. 5 is a detail sectional view on the line 5—5 of Figure 4.

The battery plate embodying the invention may be stamped, cast, pressed, or otherwise formed, integral throughout, that is to say, so far as the plate proper, or in other words, the foundation, is concerned, or this foundation may be built up by preparing a suitable frame, producing a plurality of grid sections, and arranging the said grid sections within the frame and bonding them in place. Also the more practical and logical arrangement of the grid sections is that in which they are vertically disposed within the frame and extend between the top and bottom members of the frame. Therefore, in the specific description which is to follow, it will be considered that the plate or foundation is integrally formed and that the grid sections are so arranged, it being understood that this is merely a disclosure of one practical embodiment of the invention and that various modifications may be made both in the method of manufacture and in the arrangement of the grid sections and their construction.

In the drawings, the frame of the battery plate embodying the invention is indicated in general by the numeral 1, and the said frame comprises top and bottom members 2 and 3 respectively, and side members 4. This frame, as well as the grid sections, will be formed from antimonial lead or any other metal or alloys of metals found suitable for the purpose. The top member 2 of the frame is provided with an upstanding extension 5 constituting a terminal for the connection of the usual bus bar (not shown), and the bottom member 3 of the frame may be provided with depending lugs 7 adapted to rest upon the bottom of the battery jar in the customary manner.

Within the frame 1 there are arranged a number of grid sections indicated in general by the numeral 9, and these sections may be formed integrally with each other and with the members comprising the frame 1, or they may be initially formed separate from the said frame and then arranged within the frame and burned or otherwise bonded to one another and to the said members of the frame. The grid sections 9 are preferably of substantially rectangular form and they are arranged in groups one above another. Each grid section comprises a rectangular frame consisting of a top member 10, a bottom member 11, side members 12, and transversely, substantially horizontally disposed dividing walls 13. The division walls 13 are intersected by a vertically disposed division wall 14 extending between the top and bottom members 10 and 11 of the grid section, and the top, bottom, and sides of the frame of each section, together with the division walls 13 and 14, provide a plurality of transversely extending pockets which are indicated by the numeral 15 and which are arranged in two parallel vertical series at opposite sides of the division wall 14, and electro-active filling material 16 is pressed into the said pockets.

As before stated, the grid elements are arranged within the frame 1 and are bonded to one another and to the members of the frame, and the invention contemplates a novel form and arrangement of the bonds such as to preclude distortion of the plate under certain discharging conditions of the battery and under which conditions the active material would expand abnormally and, in the ordinary type of plate, the expansive force would be imposed directly upon the top, bottom, and side members of the frame 1. In the present construction, each grid section or element is provided at each of its four corners with a bond 17 of the same thickness as the section, in the form shown in Figs. 1 and 2, and said grid sections, where they meet at their corners, have their bonds integrally united to each other either by burning or by initially producing the entire plate in integral form. When the grid elements or sections are initially formed separate from each other or in an integral series, the bonds of each section would take the form indicated in dotted lines at $a$ and $b$ in Figure 1. In any event, in the completed plate, the grid sections are bonded together only at their corners and likewise such of the sections as are located next to the top, bottom and sides of the frame 1, are bonded to these respective parts of the frame at their corners only. By bonding the grid sections to each other at their corners only and likewise bonding them to the members of the frame at their corners only, canals or passageways 18 are provided between relatively adjacent top and bottom sides of the grid sections, other canals or passageways 19 being provided between relatively adjacent sides of adjacent ones of said sections, and still other canals or passageways 20 being provided between the top, bottom and side members of the frame 1 and the grid sections which are immediately adjacent thereto. The canals or passageways referred to above constitute reservoirs for the electrolyte, and consequently, the electrolyte which is in immediate contact with the faces of the plate where the active filling 16 is presented, upon becoming somewhat depleted of its acid content, will be strengthened or replenished, through diffusion, and by the agency of such volume of the electrolyte as is present in the said canals or passageways. The canals or passageways referred to above likewise provide for a more complete circulation of the electrolyte about the plates of the battery if desired, and in order to further provide for free circulation of the electrolyte, the bonds 17 may be formed relatively thin as illustrated in Figures 3, 4 and 5 of the drawings, or, in other words, may be formed thinner than the plate as a whole so that relatively adjacent canals or passageways are placed in communication with one another at their adjacent ends, and this, notwithstanding the fact that the smooth faces of the separators employed between the plates, flatly contact the face of the negative plate. It will be evident that due to the peculiar manner in which the grid sections are arranged and bonded together, rapid diffusion of the acid content of the electrolyte with the depleted portion of the electrolyte is effected, thus assuring of a more uniform chemical reaction over the whole plate area during the periods of charge and discharge and likewise assuring of more uniform expansion and contraction of the plate as a whole. By tests, it has been demonstrated, that in a conventional battery cell of the ordinary construction in which wood separators are provided between the positive and negative plates and in which the side of the wood separator which faces the positive plate is vertically grooved to provide for circulation of the electrolyte and escape of gases, under discharge conditions, the depletion of the acid content of the electrolyte is greater as the distance from the outer edges of the separator increases, resulting from sluggish circulation of the electrolyte and slow diffusion of the acid content at the faces of the plates and separators. On the other hand, in my construction, when the battery is being discharged, and the electrolyte is depleted of its acid content, the acid content will be replenished by diffusion and more effective circulation is obtained.

In the present construction, each of the grid sections, in itself, constitutes a minute battery plate, and due to the fact that the sections are bonded to one another and likewise to the frame, at their corners only, a reinforcement is provided at precisely the point where it is most needed. On the other hand, due to the fact that the grid sections are connected at their corners only and not at any intermediate point, all four sides of every grid section may expand or bulge, upon abnormal expansion of the active material filling the pockets of the sections, the expansion being unrestricted due to the presence of the canals or passageways which surround all four sides of each section. In this manner the top, bottom and side members of the frame 1 are relieved of the strains and stresses which would otherwise be imposed upon them, and there is no likelihood of distortion of the plate as a whole. Another important advantage obtained by reason of the arrangement and peculiar manner of bonding the grid sections, lies in the fact that mechanical shocks or vibrations imparted at any point is largely absorbed before it can be transmitted to any other portion of the plate, this being particularly true because of the provision of canals or passageways about all four sides of the grid sections. Therefore, the plate as constructed possesses a certain degree of flexibility and will resist the disintegrating effect of mechanical shocks or vibrations.

Having thus described the invention, what is claimed as new is:

1. A battery plate comprising a frame, and a grid section within the frame, the grid section being bonded at its corners only to the frame and between the bonds being spaced from the frame.

2. A battery plate comprising a frame, and a grid section within the frame, the grid section being bonded at its corners only to the frame and between the bonds being spaced from the frame, the spaces substantially bounding the grid section.

3. A battery plate comprising a frame, and a grid section therein for the support of electro-active material, the grid section being separated from the frame by longitudinal spaces parallel to and substantially bounding the sides of the grid sections, except at spaced points of union between the section and the frame, the said points of union being located solely at the corners of the said grid sections.

4. A battery plate comprising a frame, and a plurality of grid sections arranged within the frame for the support of electro-active material, the grid sections being separated from each other and from the frame by spaces except at the corners of the said grid sections where they are bonded to one another and to the frame.

5. A battery plate comprising a frame, and a plurality of grid sections arranged therein for the support of electro-active material, the grid sections being united to one another at their corners only and likewise united at their corners only to the members of the frame whereby to provide longitudinal canals substantially bounding the grid sections.

6. A battery plate comprising a frame, and a plurality of grid sections arranged within the frame, adjacent sides of relatively adjacent grid sections being separated by canals providing passageways for the circulation of the electrolyte substantially bounding each grid section, the said grid sections being bonded to one another at their corners only.

7. A battery plate comprising a frame, and a plurality of grid sections arranged within the frame, adjacent sides of relatively adjacent grid sections being separated by canals providing passageways for the circulation of the electrolyte substantially bounding each grid section, the said grid sections being bonded to one another at their corners only, and the said bonds being of a thickness less than the thickness of the sections whereby to establish communication between adjacent ends of relatively adjacent canals.

8. A battery plate comprising a frame, and a plurality of grid sections within the frame, the grid sections being bonded to one another at their corners only and between the bonds being separated from each other by open spaces providing canals for the circulation of electrolyte.

9. A battery plate comprising a frame, and a plurality of grid sections within the frame, the grid sections being bonded to one another at their corners only and between the bonds being separated from each other by open spaces providing canals for the circulation of electrolyte, the bonds being of a thickness less than the thickness of the grid sections whereby to establish communication between adjacent canals.

In testimony whereof I affix my signature.

CHARLES CLAYTON RICH. [L. S.]